(12) United States Patent
Kawamura

(10) Patent No.: US 12,013,044 B2
(45) Date of Patent: Jun. 18, 2024

(54) VALVE AND APPLICATION APPARATUS

(71) Applicant: Murata Manufacturing Co., Ltd., Kyoto (JP)

(72) Inventor: Kenichiro Kawamura, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 113 days.

(21) Appl. No.: 17/810,127

(22) Filed: Jun. 30, 2022

(65) Prior Publication Data

US 2022/0333704 A1    Oct. 20, 2022

Related U.S. Application Data

(63) Continuation of application No. 16/822,552, filed on Mar. 18, 2020, now Pat. No. 11,408,524, which is a
(Continued)

(30) Foreign Application Priority Data

Dec. 22, 2017   (JP) .................................. 2017-246422

(51) Int. Cl.
*F16K 15/14*    (2006.01)
*F04B 45/04*    (2006.01)
*F16K 7/17*    (2006.01)

(52) U.S. Cl.
CPC ............ *F16K 15/144* (2013.01); *F04B 45/04* (2013.01); *F16K 7/17* (2013.01)

(58) Field of Classification Search
CPC ............... F16K 15/1402; F16K 15/144; F16K 27/0236; F04B 39/104; F04B 39/1046; F04B 43/028; F04B 45/04; F04B 45/045; F04B 53/1072; F04B 53/1092; Y10T 137/7843
See application file for complete search history.

(56) References Cited

U.S. PATENT DOCUMENTS 6,406,605 B1    6/2002 Moles
6,472,797 B1   10/2002 Kishimoto
(Continued)

FOREIGN PATENT DOCUMENTS

CN    2053701 U    2/1990
CN   103703292 A   4/2014
(Continued)

OTHER PUBLICATIONS

International Search Report for International Application No. PCT/JP2018/039124 dated Jan. 22, 2019.
(Continued)

*Primary Examiner* — Hailey K. Do
(74) *Attorney, Agent, or Firm* — Pearne & Gordon LLP

(57) ABSTRACT

A valve includes a first case member having an inflow port and a first valve seat, a second case member having an air outlet and a discharge port, a valve chamber formed by bonding the first case member and the second case member, at least one of which has a recessed shape, with a first bonding member while the recessed shape is located on an inner side, and a diaphragm formed so as to partition the valve chamber into a lower valve chamber connected to the inflow port and an upper valve chamber connecting the discharge port and the air outlet.

20 Claims, 5 Drawing Sheets

Related U.S. Application Data continuation of application No. PCT/JP2018/039124, filed on Oct. 22, 2018.

(56) References Cited

U.S. PATENT DOCUMENTS

| | | | |
|---|---|---|---|
| 9,879,669 B2 | 1/2018 | Kawamura et al. | |
| 10,047,870 B2* | 8/2018 | Wu | F16K 7/12 |
| 10,065,328 B2* | 9/2018 | Takeuchi | B25J 15/0633 |
| 10,569,076 B2* | 2/2020 | Kurihara | F16K 17/164 |
| 2002/0063758 A1* | 5/2002 | Usui | B41J 2/17523 |
| | | | 347/85 |
| 2010/0108534 A1 | 5/2010 | Carlstrom, Jr. et al. | |
| 2014/0238497 A1 | 8/2014 | Jones et al. | |
| 2015/0034847 A1 | 2/2015 | Kotani et al. | |
| 2016/0076537 A1 | 3/2016 | Kawamura et al. | |
| 2018/0128267 A1 | 5/2018 | Kawamura et al. | |
| 2018/0187797 A1 | 7/2018 | Huang et al. | |

FOREIGN PATENT DOCUMENTS

| | | |
|---|---|---|
| CN | 107091220 A | 8/2017 |
| JP | S49-87125 U | 7/1974 |
| JP | 2005-180224 A | 7/2005 |
| JP | 2007-024090 A | 2/2007 |
| JP | 2012-026274 A | 2/2012 |
| JP | 2017-026155 A | 2/2017 |
| JP | 2018-069089 A | 5/2018 |

OTHER PUBLICATIONS

Written Opinion for International Application No. PCT/JP2018/039124 dated Jan. 22, 2019.

Office Action for Chinese Patent Application No. 201880024590.8 dated Sep. 25, 2020.

* cited by examiner

VALVE AND APPLICATION APPARATUS

This is a continuation of U.S. application Ser. No. 16/822,552 filed on Mar. 18, 2020, which is a continuation of International Application No. PCT/JP2018/039124 filed on Oct. 22, 2018 which claims priority from Japanese Patent Application No. 2017-246422 filed on Dec. 22, 2017. The contents of these applications are incorporated herein by reference in their entireties.

BACKGROUND OF THE DISCLOSURE

Field of the Disclosure

The present disclosure relates to a valve configured to control a flow of a fluid for use in a pump or the like.

Description of the Related Art

Hitherto, various technologies in which a valve is connected to a pump to control a flow of a fluid are put into practical use.

In Patent Document 1, there is used such a valve that the outer peripheral end of a diaphragm arranged inside the valve is fixed to a case with double coated tapes and a flow of a fluid is controlled by using deformation of the diaphragm.

Patent Document 1: Japanese Unexamined Patent Application Publication No. 2017-26155

BRIEF SUMMARY OF THE DISCLOSURE

In the valve of Patent Document 1, however, the outer peripheral end of the diaphragm is exposed to the outside from a side of the case. Therefore, a significant load is applied to the outer peripheral end due to a difference between an external pressure and a pressure applied into a valve chamber. Thus, the outer peripheral end of the diaphragm may peel off the case due to deterioration over time or the like and the fluid in the valve chamber may leak outside. As a result, the reliability of the valve may decrease.

Therefore, an object of the present disclosure is to provide a structure in which the reliability of a valve is improved.

A valve of the present disclosure includes a first case member having an inflow port and a first valve seat, a second case member having an air outlet and a discharge port, a valve chamber formed by bonding the first case member and the second case member, at least one of which has a recessed shape, with a first bonding member while the recessed shape is located on an inner side, and a diaphragm formed so as to partition the valve chamber into a lower valve chamber connected to the inflow port and an upper valve chamber connecting the discharge port and the air outlet.

The diaphragm has a first cavity and is arranged in the valve chamber so that a periphery of the first cavity is brought into contact with the first valve seat. When a case formed by the first case member and the second case member is seen in a thickness direction, a plane area of the diaphragm is smaller than a plane area of the case. Further, an outer periphery of the diaphragm is fixed to at least one of the first case member and the second case member with the first bonding member so as to be located inside the case.

In this structure, the outer peripheral end of the diaphragm is covered with the first bonding member. Therefore, the diaphragm is not exposed to the outside of the valve (case). Thus, the bonding surface of the diaphragm is not influenced by an external pressure and a pressure in a valve chamber. Accordingly, it is possible to suppress the leakage of a fluid in the valve chamber to the outside due to, for example, the breakage (peeling) of the bonding surface.

It is preferable that the valve of the present disclosure include a reinforcing plate between the first case member and the second case member. Further, it is preferable that the first bonding member is bonded to the reinforcing plate and the first case member and is bonded to the reinforcing plate and the second case member. Further, it is preferable that a bonding strength between the first case member or the second case member and the reinforcing plate be higher than a bonding strength between the first case member and the second case member.

In this structure, the tensile bonding strength between the first case member and the second case member is improved.

It is preferable that the reinforcing plate of the valve of the present disclosure be a metal.

In this structure, the tensile bonding strengths between the reinforcing plate and the first case member and between the reinforcing plate and the second case member are improved.

It is preferable that the diaphragm provided to the valve of the present disclosure include an elastic film, a support plate, and a second bonding member that bonds the elastic film and the support plate. It is preferable that the support plate have a higher flexural rigidity than the elastic film in a vibration direction of the diaphragm relative to the thickness direction.

In this structure, the deformation amount of the diaphragm can be adjusted. Thus, the breakage of the diaphragm can be suppressed.

The support plate provided to the valve of the present disclosure may have a third cavity at a position where the third cavity faces the air outlet in the thickness direction.

In this structure, the deformation of a portion of the diaphragm that faces the air outlet can be facilitated, and the deformation of the other portion can be suppressed.

It is preferable that the support plate provided to the valve of the present disclosure be formed so as to abut against the elastic film with the second bonding member having a second cavity interposed therebetween and the third cavity be formed so as to face the second cavity.

In this structure, the support plate and the elastic film can securely be fixed by using the second bonding member. Further, the motion of the elastic film is not limited because the third cavity faces a thin portion of the elastic film.

In the valve of the present disclosure, it is preferable that a sectional area of the second cavity provided to the second bonding member be larger than a sectional area of the third cavity provided to the support plate.

In this structure, it is unlikely that the motion of the diaphragm at a portion corresponding to the air outlet is limited.

It is preferable that the support plate provided to the valve of the present disclosure have a thin portion having a small thickness at a portion that faces the air outlet.

In this structure, the displacement amount of the portion of the diaphragm that faces the air outlet is largest. The displacement amount of the other portion of the diaphragm can be reduced.

It is preferable that the support plate provided to the valve of the present disclosure be formed so as to abut against the elastic film with the second bonding member having a second cavity interposed therebetween and the thin portion be formed so as to face the second cavity.

In this structure, the support plate and the elastic film can securely be fixed by using the second bonding member. Further, the motion of the elastic film is not limited because the thickness of the thin portion is small at the portion of the elastic film that is faced by the thin portion.

It is preferable that the elastic film of the valve of the present disclosure be a rubber member.

In this structure, an elastic force of the elastic film can be increased, thereby being capable of achieving a valve having a higher accuracy. Further, the diaphragm is formed easily.

It is preferable that the support plate of the valve of the present disclosure be a metal plate.

In this structure, if the second bonding member is a double coated tape, a bonding force between the support plate and the second bonding member is improved.

In the valve of the present disclosure, it is preferable that the inflow port and the discharge port be closed by the diaphragm in a state of an inflow from the inflow port and communicated with each other in a state of an outflow from the discharge port.

In this structure, a backflow from the discharge port to the inflow port can be prevented.

Further, the valve of the present disclosure is used for an application apparatus including a pump connected to the inflow port and a cuff connected to the discharge port.

In this structure, the performance of the application apparatus is improved. For example, the application apparatus is a sphygmomanometer, a massaging apparatus, an aspirator, or a negative-pressure wound therapy apparatus.

According to the present disclosure, the reliability of the valve is improved.

DETAILED DESCRIPTION OF THE DISCLOSURE

First Embodiment

Figure 1:
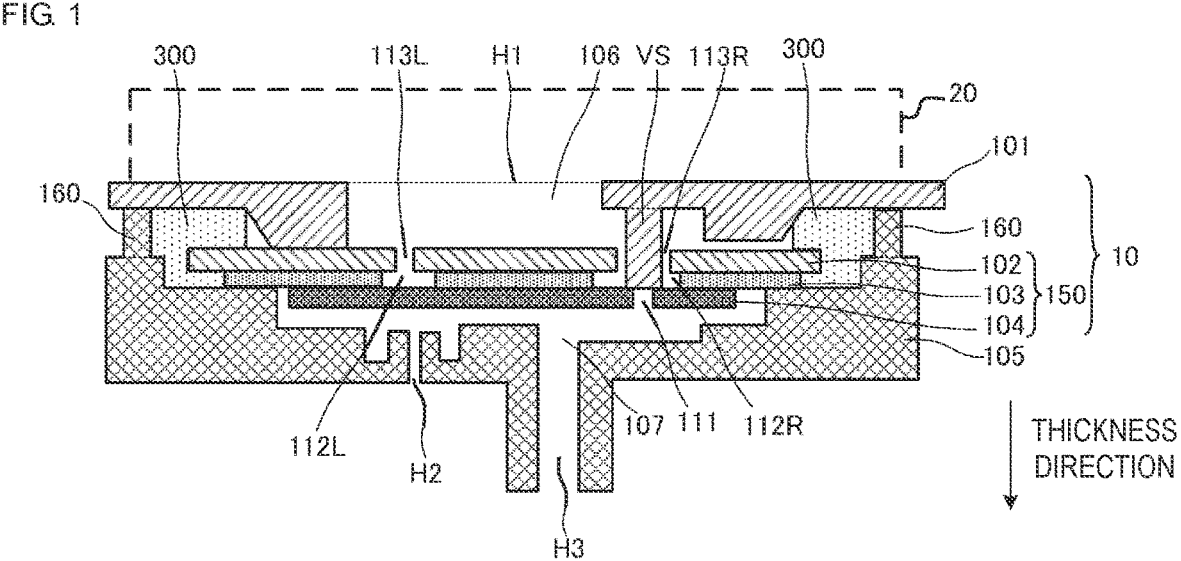
FIG. 1 is a cross-sectional side view of a valve 10 according to a first embodiment of the present disclosure.
Figure 2:
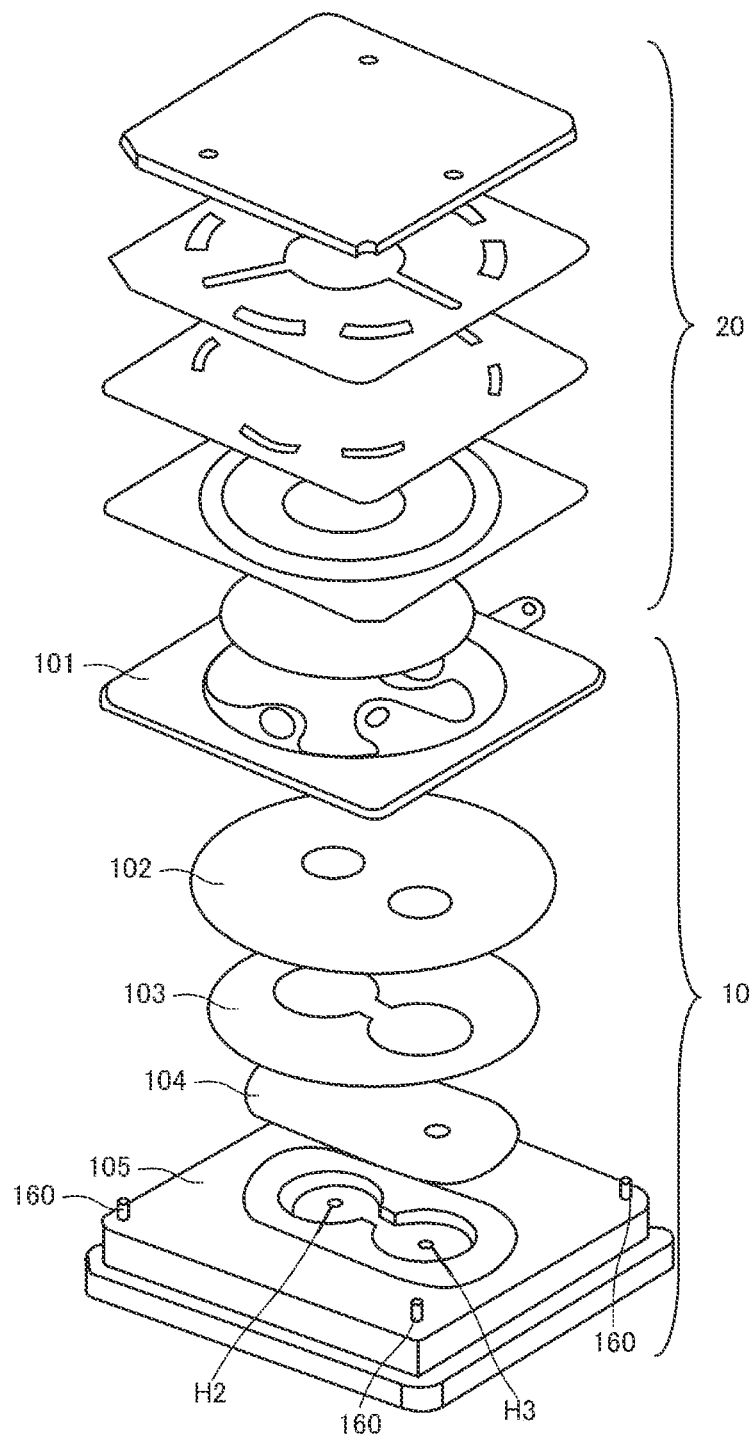
FIG. 2 is a schematic perspective view of a case in which a pump 20 is connected to the valve 10 according to the first embodiment of the present disclosure.
Figure 3:
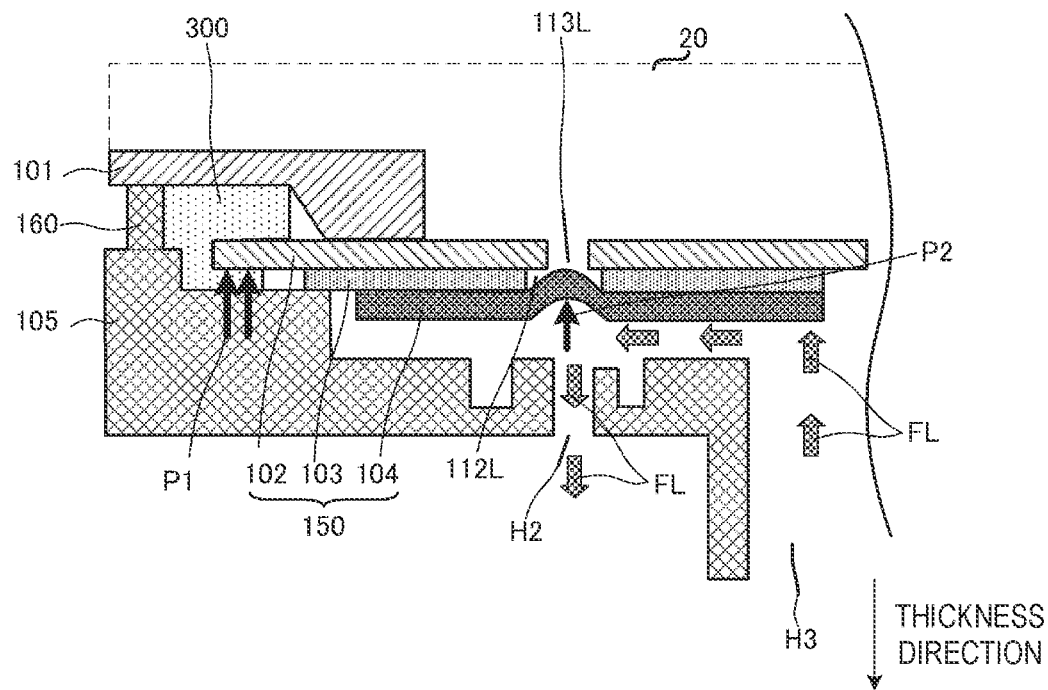
FIG. 3 is a cross-sectional side view of the valve 10 according to the first embodiment of the present disclosure.
Figure 4:
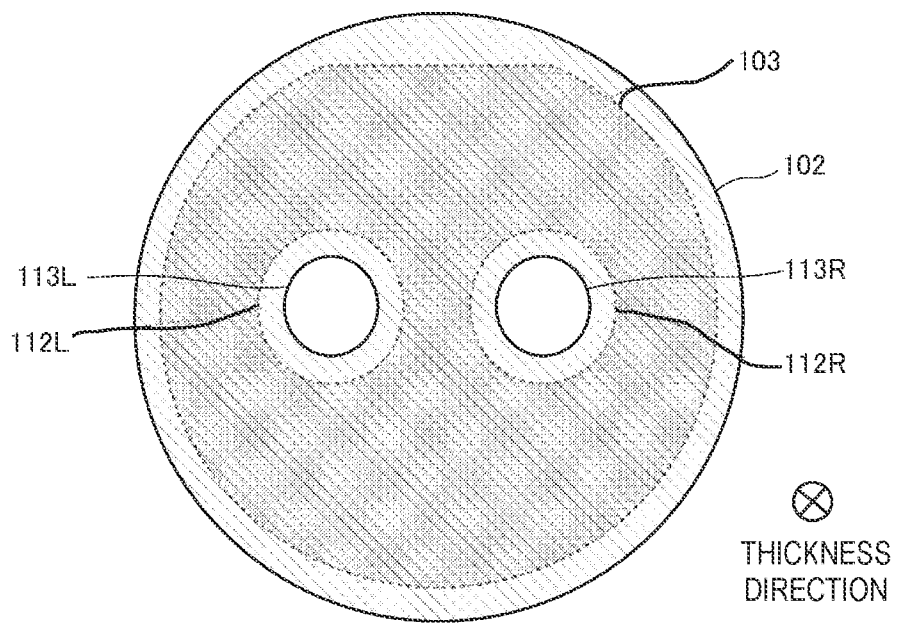
FIG. 4 is a view illustrating a partial structure of the valve 10 according to the first embodiment of the present disclosure.

A valve according to a first embodiment of the present disclosure is described with reference to the drawings. FIG. 1 is a cross-sectional side view of a valve 10 according to the first embodiment of the present disclosure. FIG. 2 is a schematic perspective view of a case in which a pump 20 is connected to the valve 10 according to the first embodiment of the present disclosure. FIG. 3 is a cross-sectional side view of the valve 10 according to the first embodiment of the present disclosure. FIG. 4 is a view illustrating a partial structure of the valve 10 according to the first embodiment of the present disclosure. Note that some reference symbols are omitted and a part of the structure is exaggerated for the sake of clear illustration.

As illustrated in FIG. 1 and FIG. 2, the pump 20 and the valve 10 are stacked in their thickness direction. That is, the direction in which the pump 20 and the valve 10 are stacked in this order is identical to the thickness direction. In the valve 10, a first case member 101 and a second case member 105 are stacked in this order in the thickness direction.

The first case member 101 substantially has a flat-plate shape and has an inflow port H1 at a substantially central position as seen in the thickness direction in plan view. The pump 20 is connected so as to abut against the inflow port H1. Further, the first case member 101 has a first valve seat VS. The first valve seat VS is shaped to protrude from a surface opposite to a surface abutting against the pump 20.

The second case member 105 has a recess at the center as seen in the thickness direction in plan view. An air outlet H2 and a discharge port H3 that communicate with the outside are provided at the bottom of the recess.

The first case member 101 is arranged so as to cover an opening of the recess of the second case member 105. With this structure, a valve chamber surrounded by the first case member 101 and the second case member 105 is formed.

Note that bosses 160 are formed on the second case member 105. The boss 160 is provided upright in the thickness direction. The top surface of the boss 160 abuts against the first case member 101. Thus, the height in the valve chamber can be achieved accurately and the first case member 101 and the second case member 105 can be fixed securely.

A diaphragm 150 is arranged inside a case formed by the first case member 101 and the second case member 105.

The diaphragm 150 includes a support plate 102, a second bonding member 103, and an elastic film 104. Further, in the diaphragm 150, the support plate 102, the second bonding member 103, and the elastic film 104 are arranged in this order from the first case member 101 side. The support plate 102 is formed so as to abut against the elastic film 104 with the second bonding member 103 interposed therebetween.

The structure for fixing the diaphragm 150 is described in more detail. The diaphragm 150 is fixed with a first bonding member 300 between the first case member 101 and the second case member 105. At this time, the outer peripheral end of the diaphragm 150 is shaped to be included in the case formed by the first case member 101 and the second case member 105 as seen in the thickness direction in plan view.

That is, the shape is such that the plane area of the diaphragm 150 is smaller than the plane area of the case as seen in the thickness direction in plan view.

Thus, the valve chamber is partitioned into a lower valve chamber 106 and an upper valve chamber 107 by the diaphragm 150 fixed with the first bonding member 300.

Further, the first bonding member 300 is, for example, a silicone adhesive. Since the first bonding member 300 is the silicone adhesive, the first case member 101, the diaphragm 150, and the second case member 105 can be fixed more securely. Further, the first bonding member 300 absorbs unnecessary the vibration of the diaphragm 150, thereby being capable of achieving a more stable valve 10.

The structure of the diaphragm 150 is described in more detail. The elastic film 104 has a first cavity 111. The second bonding member 103 has second cavities 112R and 112L. The support plate 102 has third cavities 113R and 113L.

For example, the elastic film 104 is a rubber member. Since the elastic film 104 is the rubber member, an elastic force can be increased, thereby being capable of achieving a valve 10 having higher operation efficiency.

Further, it is preferable that the support plate 102 be a member having a higher elastic modulus, that is, a higher flexural rigidity in the thickness direction than the elastic film 104. For example, the member is made of plating SUS, aluminum, copper, or resin. Note that a high flexural rigidity means a high Young's modulus. The flexural rigidity of the support plate 102 is represented by a product of a moment of inertia of area I of the support plate 102 and a Young's modulus E of a material that forms the support plate 102. That is, the flexural rigidity is represented by an expression: flexural rigidity $(N \cdot m^2)$=moment of inertia of area I $(m^4) \times$ Young's modulus E (Pa).

If the support plate 102 and the elastic film 104 are made by using the members described above, it is preferable that the second bonding member 103 that fixes the support plate 102 and the elastic film 104 be a double coated tape. Thus, the support plate 102 and the elastic film 104 can be fixed more securely.

The first cavity 111 of the elastic film 104 overlaps the second cavity 112R of the second bonding member 103. The second cavity 112R of the second bonding member 103 overlaps the third cavity 113R of the support plate 102. That is, the first cavity 111, the second cavity 112R, and the third cavity 113R overlap each other. The first valve seat VS is arranged in a space where the first cavity 111, the second cavity 112R, and the third cavity 113R overlap each other. The first valve seat VS abuts against the first cavity 111 of the elastic film 104 in a state in which a fluid does not flow into the lower valve chamber 106 from the inflow port H1.

Note that, since the first valve seat VS is formed, the positions where the first case member 101, the diaphragm 150, and the second case member 105 are formed can be determined accurately when the valve 10 is formed. Further, it is preferable that the first valve seat VS be rounded at a portion that abuts against the first cavity 111. Thus, breakage of the elastic film 104 or the like can be suppressed when the valve 10 operates.

The second cavity 112L of the second bonding member 103 faces the third cavity 113L of the support plate 102. Further, the second cavity 112L of the second bonding member 103 is formed at a position where the second cavity 112L faces the air outlet H2 of the second case member 105 across the elastic film 104. That is, the second cavity 112L, the third cavity 113L, and the air outlet H2 overlap each other in plan view.

As illustrated in FIG. 2, the valve 10 is used by being connected to the pump 20. The valve 10 sends the fluid flowing from the pump 20 to an unillustrated cuff or the like connected to the valve 10.

An operation to be performed when the pump 20 is driven is described in detail. The pump 20 causes the fluid to flow into the inflow port H1 of the valve 10 by driving a piezoelectric body. When the fluid flows into the lower valve chamber 106, a pressure in the lower valve chamber 106 becomes higher than that in the upper valve chamber 107. Thus, the diaphragm 150 is deformed and the first cavity 111 separates from the first valve seat VS. Thus, the fluid flows into the first cavity 111 from the lower valve chamber 106 through the third cavity 113R and the second cavity 112R.

The fluid flows into the upper valve chamber 107 through the first cavity 111 and flows out to the unillustrated cuff or the like from the discharge port H3. That is, when the pump 20 is driven, the inflow port H1 and the discharge port H3 are communicated with each other.

Regarding the discharge port H3 and the air outlet H2, on the other hand, the deformed diaphragm 150 closes a space between the discharge port H3 and the air outlet H2 by abutting against a wall between the air outlet H2 and the discharge port H3.

An operation to be performed when the pump 20 is stopped is described in detail. When the pump 20 is stopped, a pressure in the pump 20 is released to the atmosphere and the pressure in the upper valve chamber 107 becomes higher than that in the lower valve chamber 106. Thus, the fluid in the unillustrated cuff or the like flows into the upper valve chamber 107 through the discharge port H3. The diaphragm 150 is deformed so as to bulge toward the lower valve chamber 106, and the first cavity 111 abuts against the first valve seat VS. Further, the diaphragm 150 is separated from the wall between the discharge port H3 and the air outlet H2, and the discharge port H3 and the air outlet H2 are communicated with each other. That is, when the pump 20 is stopped, the inflow port H1 and the discharge port H3 are not communicated with each other. On the other hand, the discharge port H3 and the air outlet H2 are communicated with each other.

An operation of the valve 10 to be performed when the pump 20 is stopped is described in more detail with reference to FIG. 3. When the pump 20 is stopped, a fluid FL flows into the discharge port H3 from the unillustrated cuff or the like. The fluid FL flows out from the air outlet H2.

At this time, a pressure P2 is applied toward the pump 20 side of the elastic film 104, that is, in a direction opposite to the thickness direction as described above.

The diaphragm 150 is displaced along with displacement of the elastic film 104. At this time, a pressure P1 applied to the outer periphery of the diaphragm 150 is higher than the pressure P2 applied at the position where the diaphragm 150 faces the discharge port H3. Thus, in a related-art structure, the diaphragm 150 is likely to break (peel) off the first case member 101 and the second case member 105 due to the deterioration over time or the like.

However, the diaphragm 150 of the present disclosure is not exposed to an interface between the first case member 101 and the second case member 105. Therefore, the diaphragm 150 is unlikely to peel off the first case member 101 and the second case member 105 because no stress is generated by a pressure difference between an external pressure and the pressure in the valve chamber. Thus, the leakage of the fluid in the lower valve chamber 106 and the upper valve chamber 107 to the outside of the valve 10 can be suppressed without influence of the external pressure.

Further, FIG. 4 is a plan view of the support plate 102 and the second bonding member 103 as seen in the thickness direction. An opening area of the second cavity 112L when the second cavities 112R and 112L are seen in the thickness direction in plan view is defined as an opening area S1. Similarly, an opening area of the third cavity 113L when the third cavity 113L is seen in the thickness direction in plan view is defined as an opening area S2.

Because of opening area S1>opening area S2, the displacement amount of a portion that overlaps the air outlet H2 can be increased compared with a case in which the third cavity 113L is not provided, thereby being capable of adjusting the displacement amount of the other portion of the elastic film 104.

The elastic film 104 is deformed while securing a displacement amount necessary for the displacement of the portion of the elastic film 104 that overlaps the air outlet H2. Thus, the excessive deformation toward the lower valve chamber 106 can be suppressed. That is, the breakage of the elastic film 104 can be suppressed.

With this structure, it is possible to achieve a structure of a valve having a high reliability.

Further, the valve 10 is used for an application apparatus that uses, for example, the pump 20 connected to the inflow port H1 and the cuff connected to the discharge port H3. Note that the valve 10 is a pressurizing portion. For example, the application apparatus is a sphygmomanometer, a massaging apparatus, an aspirator, or a negative-pressure wound therapy apparatus.

Second Embodiment

Figure 5:
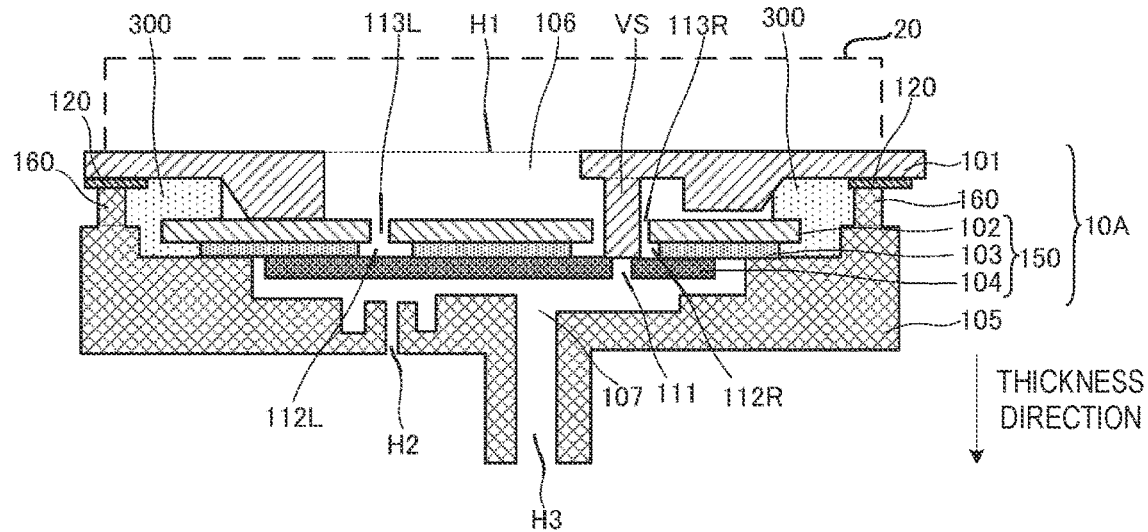
FIG. 5 is a cross-sectional side view of a valve 10A according to a second embodiment of the present disclosure.

A valve according to a second embodiment of the present disclosure is described with reference to the drawings. FIG. 5 is a cross-sectional side view of a valve 10A according to the second embodiment of the present disclosure. Note that some reference symbols are omitted and a part of the structure is exaggerated for the sake of clear illustration.

As illustrated in FIG. 5, the valve 10A according to the second embodiment differs from the valve 10 according to the first embodiment in that a reinforcing plate 120 is provided. The other structure of the valve 10A is similar to that of the valve 10 and the description of similar parts is omitted.

The reinforcing plate 120 is formed between the first case member 101 and the second case member 105 in the thickness direction. The reinforcing plate 120 and the first case member 101 are bonded with a double coated tape, an adhesive, or the like. The first case member 101 and the second case member 105 are bonded with the first bonding member 300 with the reinforcing plate 120 interposed therebetween.

The reinforcing plate 120 is a metal plate.

Note that a bonding force between the reinforcing plate 120 and the support plate 102 that are metals increases by using the first bonding member 300.

Thus, the bonding strength between the first case member 101 and the second case member 105 can be increased with this structure, thereby being capable of suppressing the peeling of the first case member 101 and the second case member 105. Note that the bonding strength is a tensile bonding strength.

Further, a bonding force among the first case member 101, the second case member 105, and the reinforcing plate 120 is improved because the reinforcing plate 120 and the support plate 102 are metals and the first bonding member 300 is used for bonding. Thus, the reliability of the valve 10A is further improved.

Further, the breakage of the elastic film 104 is suppressed by the support plate 102 similarly to the first embodiment.

Third Embodiment

Figure 6:
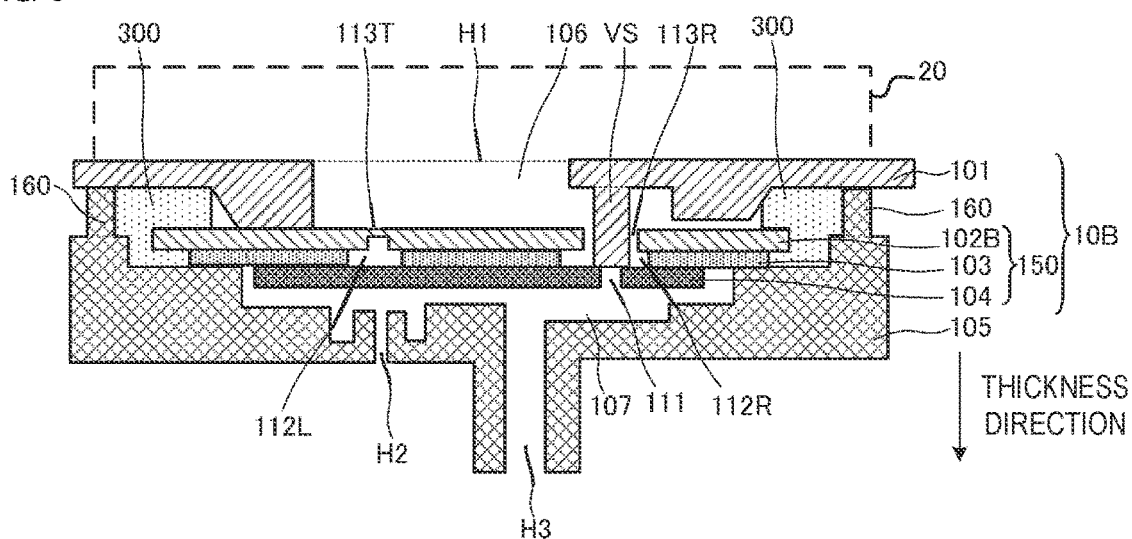
FIG. 6 is a cross-sectional side view of a valve 10B according to a third embodiment of the present disclosure.

A valve according to a third embodiment of the present disclosure is described with reference to the drawings. FIG. 6 is a cross-sectional side view of a valve 10B according to the third embodiment of the present disclosure. Note that some reference symbols are omitted and a part of the structure is exaggerated for the sake of clear illustration.

As illustrated in FIG. 6, the valve 10B according to the third embodiment differs from the valve 10 according to the first embodiment in that a support plate 102B has a thin portion 113T. The other structure of the valve 10B is similar to that of the valve 10 and the description of similar parts is omitted.

The support plate 102B has the third cavity 113R and the thin portion 113T.

The second cavity 112L of the second bonding member 103 overlaps the thin portion 113T of the support plate 102B in plan view. Further, the second cavity 112L of the second bonding member 103 is formed at the position where the second cavity 112L faces the air outlet H2 of the second case member 105 across the elastic film 104.

In the thickness direction, the thickness of the thin portion 113T is smaller than the thickness of the support plate 102B except the thin portion 113T. That is, the thin portion 113T is achieved by a recessed portion formed in the support plate 102B.

In this structure as well, the breakage of the elastic film 104 is suppressed by the support plate 102B similarly to the first embodiment.

Fourth Embodiment

Figure 7:
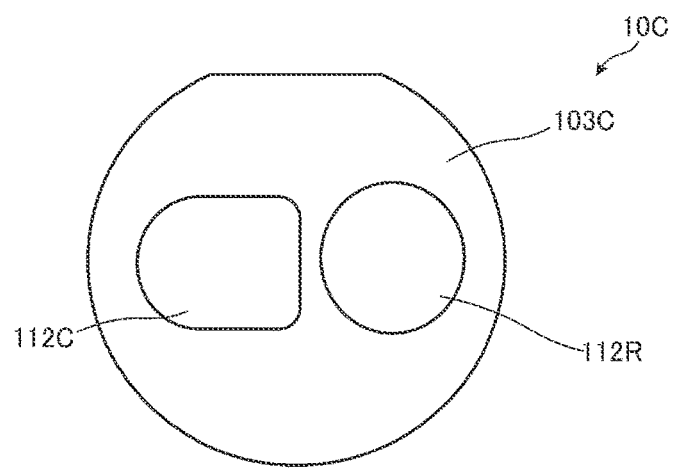
FIG. 7 is a view illustrating a partial structure of a valve 10C according to a fourth embodiment of the present disclosure.

A valve according to a fourth embodiment of the present disclosure is described with reference to the drawings. FIG. 7 is a view illustrating the structure of a second bonding member 103C of a valve 10C according to the fourth embodiment of the present disclosure.

As illustrated in FIG. 7, the valve 10C according to the fourth embodiment differs from the valve 10 according to the first embodiment in terms of the shape of a second cavity 112C of the second bonding member 103C. The other structure of the valve 10C is similar to that of the valve 10 and the description of similar parts is omitted.

The second cavity 112C faces the third cavity 113L. An opening area of the second cavity 112C is larger than the opening area of the third cavity 113L. Further, the shape of the second cavity 112C is a shape obtained by combining a circle and a rectangle.

In this structure as well, the breakage of the elastic film 104 can be suppressed similarly to the structures described above. Thus, the operations and advantages similar to those of the first embodiment are attained.

Further, the shapes of the second cavity 112C and the second cavity 112R differ from each other, thereby being capable of preventing the attachment of the second bonding member 103C in a wrong direction during the manufacture.

Fifth Embodiment

Figure 8:
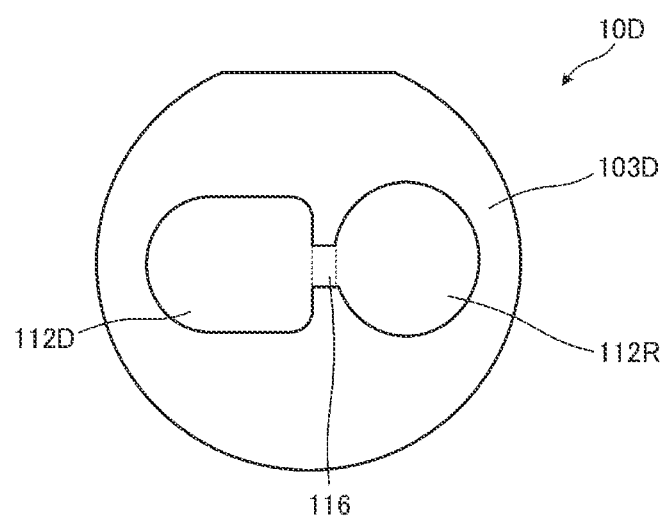
FIG. 8 is a view illustrating a partial structure of a valve 10D according to a fifth embodiment of the present disclosure.

A valve according to a fifth embodiment of the present disclosure is described with reference to the drawings. FIG. 8 is a view illustrating the structure of a second bonding member 103D of a valve 10D according to the fifth embodiment of the present disclosure.

As illustrated in FIG. 8, the valve 10D according to the fifth embodiment differs from the valve 10 according to the first embodiment in terms of the shape of a second cavity 112D of the second bonding member 103D and in that a cavity connecting portion 116 connecting the second cavity 112D and the second cavity 112R is provided. The other structure of the valve 10D is similar to that of the valve 10 and the description of similar parts is omitted.

The second cavity 112D faces the third cavity 113L. Further, the second cavity 112D and the second cavity 112R are connected by the cavity connecting portion 116.

An opening area of the second cavity 112D is larger than the opening area of the third cavity 113L. Further, a shape obtained by combining the second cavity 112D, the cavity connecting portion 116, and the second cavity 112R is substantially an anchor shape.

In this structure as well, the breakage of the elastic film 104 can be suppressed similarly to the structures described above. Thus, the operations and advantages similar to those of the first embodiment are attained.

Further, the shapes of the second cavity 112D and the second cavity 112R differ from each other, thereby being capable of preventing attachment of the second bonding member 103D in a wrong direction during manufacture.

Note that the structure is not limited to those of the embodiments described above but may be a structure obtained by changing the combination of those embodiments.

FL fluid
H1 inflow port
H2 air outlet
H3 discharge port
P1, P2 pressure
S1, S2 opening area
VS first valve seat
10, 10A, 10B, 10C, 10D valve
20 pump
101 first case member
102, 102B support plate
103, 103C, 103D second bonding member
104 elastic film
105 second case member
106 lower valve chamber
107 upper valve chamber
111 first cavity
112C, 112D, 112L, 112R second cavity
113L, 113R third cavity
113T thin portion
116 cavity connecting portion
120 reinforcing plate
150 diaphragm
160 boss
300 first bonding member

The invention claimed is:

1. A valve, comprising:
a first case member having an inflow port and a first valve seat;
a second case member having an air outlet and a discharge port;
a valve chamber surrounded by the first case member and the second case member, wherein at least one of the first case member and the second case member has a recessed shape, and where the first case member and the second case member are bonded to each other with a first bonding member so that the recessed shape is located on an inner side of the valve chamber; and
a diaphragm partitioning the valve chamber into a lower valve chamber connected to the inflow port and an upper valve chamber connecting the discharge port and the air outlet,
wherein the diaphragm has a first cavity and is arranged in the valve chamber so that a periphery of the first cavity is brought into contact with the first valve seat,
wherein, when a case comprising the first case member and the second case member is seen in a thickness direction, a plane area of the diaphragm is smaller than a plane area of the case,
wherein an outer periphery of the diaphragm is fixed to at least one of the first case member and the second case member with the first bonding member so as to be located inside the case,
wherein the first bonding member comprises an adhesive, and
wherein the diaphragm comprises a support plate including an outer peripheral end encased in the adhesive.

2. The valve according to claim 1,
wherein the inflow port and the discharge port are closed by the diaphragm when a fluid is flown from the inflow port, and
wherein the inflow port is communicated with the discharge port when the fluid is discharged from the discharge port.

3. An application apparatus, comprising:
the valve according to claim 1;
a pump connected to the inflow port; and
a cuff connected to the discharge port.

4. The valve according to claim 1, further comprising a reinforcing plate between the first case member and the second case member,
wherein the first bonding member bonds the reinforcing plate to the first case member and bonds the reinforcing plate to the second case member, and
wherein a bonding strength between the first case member or the second case member and the reinforcing plate is higher than a bonding strength between the first case member and the second case member.

5. The valve according to claim 4, wherein the reinforcing plate is a metal plate.

6. The valve according to claim 4,
wherein the diaphragm comprises an elastic film and a second bonding member bonding the elastic film to the support plate, and
wherein the support plate has a higher flexural rigidity than the elastic film in a vibration direction of the diaphragm relative to the thickness direction.

7. The valve according to claim 1,
wherein the diaphragm comprises an elastic film and a second bonding member bonding the elastic film to the support plate, and
wherein the support plate has a higher flexural rigidity than the elastic film in a vibration direction of the diaphragm relative to the thickness direction.

8. The valve according to claim 7, wherein the elastic film is a rubber member.

9. The valve according to claim 7, wherein the support plate is a metal plate.

10. The valve according to claim 7, wherein the support plate has a thin portion at a position facing the air outlet, wherein the thin portion has a smaller thickness than other portions of the support plate.

11. The valve according to claim 10, wherein the elastic film is a rubber member.

12. The valve according to claim 10,
wherein the support plate abuts against the elastic film through the second bonding member having a second cavity, and
wherein the thin portion to facing the second cavity.

13. The valve according to claim 12, wherein the elastic film is a rubber member.

14. The valve according to claim 7, wherein the support plate has a third cavity at a position facing the air outlet in the thickness direction.

15. The valve according to claim 14, wherein the elastic film is a rubber member.

16. The valve according to claim 14, wherein the support plate is a metal plate.

17. The valve according to claim 14,
wherein the support plate abuts against the elastic film through the second bonding member having a second cavity, and
wherein the third cavity facing the second cavity.

18. The valve according to claim 17, wherein the elastic film is a rubber member.

19. The valve according to claim 17, wherein a sectional area of the second cavity is larger than a sectional area of the third cavity.

20. The valve according to claim 19, wherein the elastic film is a rubber member.

* * * * *